(12) United States Patent
Naor et al.

(10) Patent No.: US 6,418,136 B1
(45) Date of Patent: Jul. 9, 2002

(54) ANNOUNCED DYNAMIC ACCESS PROBABILITY PROTOCOL FOR SHARED BANDWIDTH NETWORKS

(75) Inventors: Zohar Naor; Hanoch Levy, both of Tel Aviv (IL)

(73) Assignee: Ramot University Authority for Applied Research and Industrial Development LTD, Tel Aviv (IL)

( * ) Notice: Subject to any disclaimer, the term of this patent is extended or adjusted under 35 U.S.C. 154(b) by 0 days.

(21) Appl. No.: 09/195,423

(22) Filed: Nov. 18, 1998

(51) Int. Cl.[7] .................. H04B 7/212; H04L 12/413
(52) U.S. Cl. ........................... 370/347; 370/445
(58) Field of Search .................... 370/252, 316, 370/321, 322, 328, 329, 336, 338, 341, 347, 348, 349, 400, 352, 431, 433, 437, 438, 439, 442, 443, 445–449, 461–462, 477, 468, 229–236; 455/450–452, 512, 517; 379/92.03–92.04; 709/203, 220, 223–229; 710/107, 109, 110, 116, 117, 240, 244

(56) References Cited

U.S. PATENT DOCUMENTS

| | | | | |
|---|---|---|---|---|
| 5,752,193 A | * | 5/1998 | Scholefield et al. | 455/452 |
| 5,792,542 A | * | 8/1998 | Morgon | 428/102 |
| 6,047,052 A | * | 4/2000 | Sakai et al. | 379/133 |
| 6,078,568 A | * | 6/2000 | Wright et al. | 370/312 |
| 6,195,338 B1 | * | 2/2001 | Decker | 370/252 |

* cited by examiner

Primary Examiner—Huy D. Vu
Assistant Examiner—Steven Nguyen
(74) Attorney, Agent, or Firm—Mark M. Friedman (57) ABSTRACT

A system and a method for a dynamic probability access protocol for determining access to shared channels. Some networks have a common channel which is shared by many users. A key issue in such networks is the allocation of the shared channel among many competing users. The system and method of the present invention enable media access control in shared bandwidth networks. When the user wishes to send a message, the user transmits with a probability p, which depends on the load on the channel. The probability p is announced by the network, and transmitted to the users as a broadcast message. Under conditions of low load, the probability p approaches 1, while at high load p is relatively low. This media access control protocol guarantees high channel utilization at high load, as well as low delay at low load periods. The proposed method is applicable on wireless networks, such as cellular networks and satellite-based networks. In addition, the method and system of the present invention can be used in wired networks, for other applications such as local area networks (LAN), client/server networks, and accessing a Web site through the Internet. The method and system of the present invention are able to reduce the likelihood of collisions, without increasing the access delay at low load periods.

20 Claims, 6 Drawing Sheets

ANNOUNCED DYNAMIC ACCESS PROBABILITY PROTOCOL FOR SHARED BANDWIDTH NETWORKS

FIELD AND BACKGROUND OF THE INVENTION

The present invention is of a method and a system for determining access to a network according to the probability of obtaining such access, and in particular to a method and a system for determining such access according to a dynamic protocol.

Networks in which many independent users share a common channel are widely spread. Examples of such networks are wireless networks, local area networks, and client-server computer networks. A key issue in these networks is the allocation of a shared channel among many competing users who wish to gain access. There are three basic strategies for shared channel acquisition which are known in the background art. The first such strategy is that of contention protocols, as in ALOHA and CSMA protocols. The second strategy includes collision-free methods, such as Time Division Multiplexing (TDM) and Frequency Division Multiplexing (FDM), while the third strategy is known as limited contention.

The basic idea of contention protocols is that users transmit whenever they have data to send. As a result, collisions are unavoidable. An example of a contention protocol is the ALOHA protocol and its many variants (for a description of ALOHA and its variants, see Tanenbaum A. S., *Computer Networks*, Prentice-Hall, 1996, pp. 121–124 for example, herein incorporated by reference only to teach pure ALOHA and slotted ALOHA protocols). Another example of contention is the carrier sense protocols. For carrier sense protocols, in order to reduce the likelihood of collision, users detect the state of the channel whenever they wish to transmit, but only send a message if no other user is transmitting. An example of a carrier sense protocol is the CSMA and its many variants.

Collision-free protocols divide the users into disjoint groups, such that a collision is impossible. An example of a collision-free protocol is the Time Division Multiplexing (TDM) protocol, in which each user has a dedicated time slot.

Another approach, which is a combination of the contention and the collision-free strategies, is the limited contention strategy. This strategy employs the contention protocol at periods of low loads, and a collision-free strategy at periods of high load. This is accomplished by dividing the stations into groups, which are not necessarily disjoint, such that at any given time, only one member of each group is permitted to transmit. The number of users in each group changes dynamically as a function of the load.

The contention protocols are preferable under conditions of light load, because of their low delay. As the load increases, the likelihood of collisions becomes significant, and the channel efficiency of contention protocols at high load is very poor. For example, the channel utilization of the ALOHA is very poor under high load. In order to overcome this problem, a variant of the ALOHA protocol was proposed, in which each user attempts to access the shared channel with some probability p, $0 \leq p \leq 1$. In comparison to the original or slotted ALOHA protocols, this method has better channel utilization under conditions of high load. However, the time delay at low load is larger. Thus, even the addition of probability access cannot overcome the inherent flaws of contention protocols.

Collision-free protocols have high delay at low load, but the channel efficiency at high load is much better then that of contention protocols. The simplest collision-free methods are TDM and FDM. These allocation schemes are efficient when the number of users is small, and the traffic is continuous. Under conditions of bursty traffic, or when the number of users is large and variable, collusion-free protocols are poor choices.

The limited contention protocols are based on collision detection capability. Namely, every collision is immediately detected by all users. Unfortunately, in some networks, such as wireless networks there is no collision detection capability: The users transmit messages through an up-link channel, and receive messages through a down-link channel. Hence, each user is only aware of collisions for messages sent by that particular user by using a time out acknowledge mechanism, but is not aware of collisions of messages from other users. These protocols are particularly impractical for satellite-based networks which have huge propagation delay and a large area covered by the network, since a user cannot always detect transmissions of other users, even when listening to the up-link channel. Listening to the down-link channel would not help because of the propagation delay. Thus, the currently available methods for sharing a limited amount of bandwidth have many drawbacks.

There is therefore a need for, and it would be useful to have, a protocol suitable for limited contention multiple access, which is efficient at conditions of both high load and low load, and which would also be suitable for satellite networks.

SUMMARY OF THE INVENTION

In the method and system of the present invention, the network channel determines a channel access probability which depends on the load of the network channel. The channel access probability is announced as a broadcast message to the users. Each user attempts to access the shared channel according to the announced probability. Thus, whenever the load on the shared channel is low, the users are requested to access the channel more often, while at loaded time periods the users wishing to access the channel may need to wait before attempting to access the network channel.

According to the present invention, there is provided a system for determining access of at least one of a plurality of users to a shared transmit channel, the shared transmit channel being shared by the plurality of users and the shared transmit channel being at least a portion of a network for connecting the plurality of users, the system comprising: (a) an access authority for determining an access probability for access by the at least one of the plurality of users according to a load on the shared transmit channel, the access probability being a probability of accessing the shared transmit channel; and (b) an access broadcaster for broadcasting the access probability to the at least one of the plurality of users, such that the at least one of the plurality of users accesses the shared transmit channel according to the access probability.

Preferably, the network is a satellite network, the access authority is a satellite, the access broadcaster is a down-link signaling channel from the satellite and the shared transmit channel includes an up-link signaling channel for transmitting a request to transmit data to the satellite.

Alternatively and preferably, the network is a cellular network, the shared transmit channel includes an up-link signaling channel, the access authority is selected from the group consisting of a mobile switching center and a base station, and the access broadcaster is the base station. More preferably, for either the cellular network or the satellite network, the at least one user attempts to transmit a Request-to-Send (RTS) message according to the access probability on the up-link signaling channel.

Also alternatively and preferably, the network is a LAN (local area network), the shared transmit channel is a bandwidth of the LAN, the access authority is a network manager and the access broadcaster is at least one address received by substantially the entirety of the plurality of users.

Also alternatively and preferably, the network is an Internet, the access authority is a Web server, the shared transmit channel is an URL for obtaining a Web page and the access broadcaster is an URL for obtaining the access probability.

Preferably, the access probability is at least partially determined according to a type of transmission being transmitted by the at least one of the plurality of users on the shared transmit channel.

Also preferably, the access probability is at least partially determined according to the at least one of the plurality of users. Also preferably, the load is determined according to an average number of transmission attempts by the plurality of users. More preferably, the access probability is determined according to the load, R, according to a previous access probability, $P_{cur}$, and according to an optimal rate of transmission attempts, $R_{opt}$. Most preferably, the access probability is determined according to an equation:

$$P_{cur} \frac{R_{opt}}{R} \text{ if } R > R_{opt}$$

alternatively, if $R \leq R_{opt}$, the equation is min $$\min\left\{P_{cur} \frac{R_{opt}}{R}, 1\right\}.$$

According to another embodiment of the present invention, there is provided a system for determining access of at least one of a plurality of users to an up-link signaling channel, the up-link signaling channel being shared by the plurality of users, the up-link signaling channel being at least a portion of a network for connecting the plurality of users, the system comprising: (a) an access authority for determining an access probability for access by the at least one of the plurality of users according to a load on the up-link signaling channel, the access probability being a probability of accessing the up-link signaling channel; and (b) a down-link signaling channel for broadcasting the access probability to the at least one of the plurality of users, such that the at least one of the plurality of users accesses the up-link signaling channel according to the access probability.

According to yet another embodiment of the present invention, there is provided a method for determining access of at least one of a plurality of users to a shared transmit channel, the shared transmit channel being shared by the plurality of users and the shared transmit channel being at least a portion of a network for connecting the plurality of users, the steps of the method being performed by a data processor and the method comprising the steps of: (a) estimating an average number of transmission attempts by the plurality of users on the shared transmit channel; (b) determining an access probability according to the average number of transmission attempts; (c) announcing the access probability to the at least one of the plurality of users; (d) receiving the access probability by the at least one of the plurality of users; and (e) accessing the shared transmit channel by the at least one of the plurality of users according to the access probability.

Hereinafter, the term "computing platform" refers to a particular computer hardware system or to a particular software operating system. Examples of such hardware systems include, but are not limited to, personal computers (PC), Macintosh™ computers, mainframes, minicomputers and workstations. Examples of such software operating systems include, but are not limited to, UNIX, VMS, Linux, MacOS™, DOS, one of the Windows™ operating systems by Microsoft Inc. (Seattle, Wash., USA), including Windows NT™, Windows 3.x™ (in which "x" is a version number, such as "Windows 3.1™") and Windows95™.

For the implementation of the present invention, a software application could be written in substantially any suitable programming language, which could easily be selected by one of ordinary skill in the art. The programming language chosen should be compatible with the computing platform according to which the software application is executed. Examples of suitable programming languages include, but are not limited to, C, C++ and Java.

In addition, the present invention could also be implemented as firmware or hardware. Hereinafter, the term "firmware" is defined as any combination of software and hardware, such as software instructions permanently burnt onto a ROM (read-only memory) device. As hardware, the present invention could be implemented as substantially any type of chip or other electronic device capable of performing the functions described herein.

In any case, the present invention can be described as a plurality of instructions being executed by a data processor, in which the data processor is understood to be implemented according to whether the present invention is implemented as software, hardware or firmware.

Hereinafter, the term "Web browser" refers to any software program which can be used to view a document written at least partially with at least one instruction taken from HTML (HyperText Mark-up Language) or VRML (Virtual Reality Modeling Language), or any other equivalent computer document language, hereinafter collectively and generally referred to as "document mark-up language". Examples of Web browsers include, but are not limited to, Mosaic™, Netscape Navigator™ and Microsoft™ Internet Explorer™.

In order to teach various types of data networks, *Data Networks* is herein incorporated by reference (Bertsekas D. and Gallager R., *Data Networks*, 2nd ed. Englewood Cliffs, N.J.: Prentice Hall, 1992).

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method and a system for controlling access to shared bandwidth networks. When the user wishes to send a message, the user transmits with a probability p, which depends on the load on the channel. The probability p is announced by the network, and transmitted to the users as a broadcast message. Under conditions of low load, the probability p approaches 1, while at high load p is relatively low. Thus, the system and method of the present invention guarantee high channel utilization at high load, as well as low delay at low load periods.

The system and method of the present invention differ from background art load-sensitive protocols in that they operate according to a combination of both distributed and centralized load-distribution protocols. The protocol is distributed in the sense that each user decides when to access the shared network channel. However the rate of access by the users is centrally controlled by the network, and changes dynamically as a function of the load on the channel. Thus, the system and method of the present invention clearly differ from currently available load-sensitive algorithms, which are either centralized, in which system resources are allocated to the users by the system, or distributed, in which each user determines access according to a shared MAC protocol.

The ability of the method and system of the present invention to combine the best features of both distributed and centralized load-distribution protocols increases the efficacy of the present invention at both low and high loads on the shared channel. To reduce the likelihood of collision and improve system performance for the system and method of the present invention, the network, or an entity controlling the network, determines the rate of channel access.

The method and system of the present invention are applicable to wireless networks, such as cellular networks and satellite-based networks. In addition, the method and system of the present invention can be used in wired networks, for other applications such as local area networks (LAN), client/server networks, and accessing a Web site through the Internet.

The principles and operation of a method and a system according to the present invention may be better understood with reference to the drawings and the accompanying description.

Figure 1A:
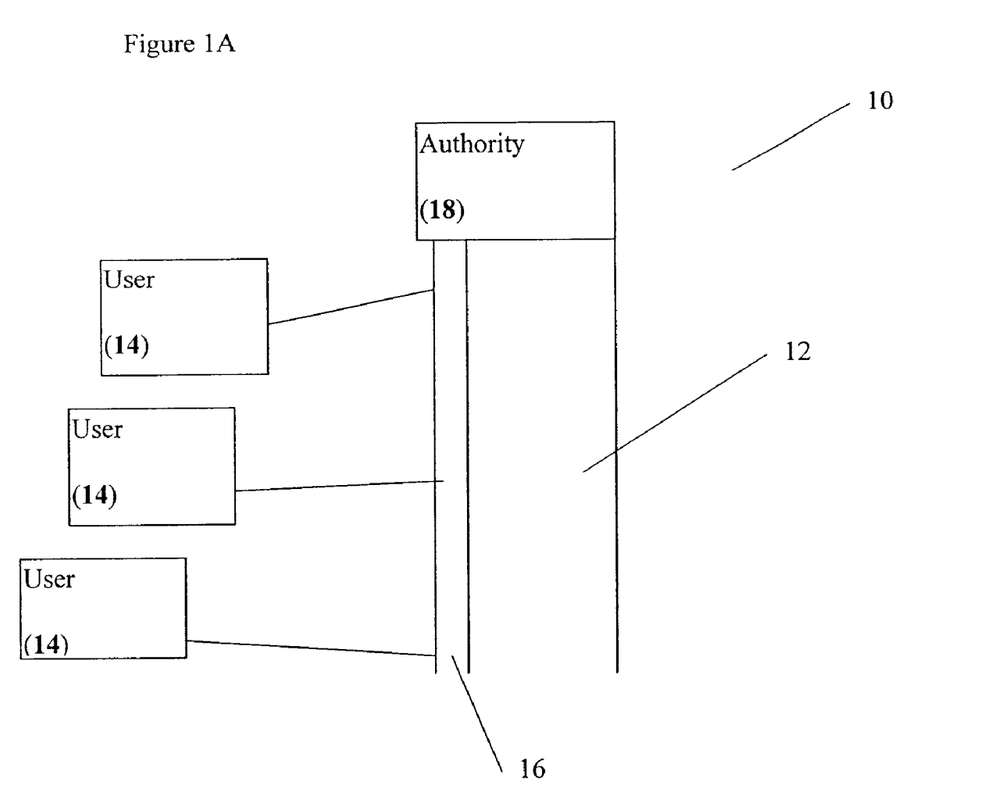
FIGS. 1A and 1B are schematic block diagrams showing two embodiments of an exemplary system for dynamic access according to probability of the present invention.

Referring now to the drawings, FIG. 1A shows an exemplary system for dynamic access according to probability of the present invention, in which a data channel is directly accessed by a user. A system 10 features a transmit channel 12 which is shared by a plurality of users 14. Transmit channel 12 is part of a network which has shared bandwidth (not shown).

Each user 14 attempting to gain access to transmit channel 12 listens to an access broadcaster 16. Access broadcaster 16 carries the probability of access to transmit channel 12, as determined by an access authority 18. User 14 listens to access broadcaster 16 in order to obtain the probability of access to transmit channel 12. User 14 then attempts to access transmit channel 12 according to the probability of access determined by access authority 18. Thus, at conditions of relatively low load, the probability of access by user 14 is relatively high, while at conditions of high load, the probability of access by user 14 is relatively low.

The access probability is determined by the load on transmit channel 12. Whenever the rate of transmission attempts per time unit by users 14 exceeds a pre-defined maximum attempt threshold, the access probability decreases. On the other hand, whenever the rate of transmission attempts per time unit by users 14 drops below a pre-defined minimum attempt threshold, the access probability increases. Hence, by listening to access broadcaster 16, and counting the number of transmission attempts per time unit by users 14, the access probability can be optimized to achieve an optimal channel efficiency for transmit channel 12.

System 10 is therefore operated according to a combination of both distributed and centralized load-distribution protocols. The protocol according to which system 10 is operated is distributed in the sense that each user 14 decides when to access transmit channel 12. However the rate of access by users 14 is centrally controlled by access authority 18, and changes dynamically as a function of the load on transmit channel 12.

The exact identity of transmit channel 12, access broadcaster 16 and access authority 18 depends upon the nature of the network of which transmit channel 12 is a portion. Several different examples of networks which could implement the system and method of the present invention are given below, it being understood that these are examples only and are not meant to be limiting in any way.

Figure 1B:
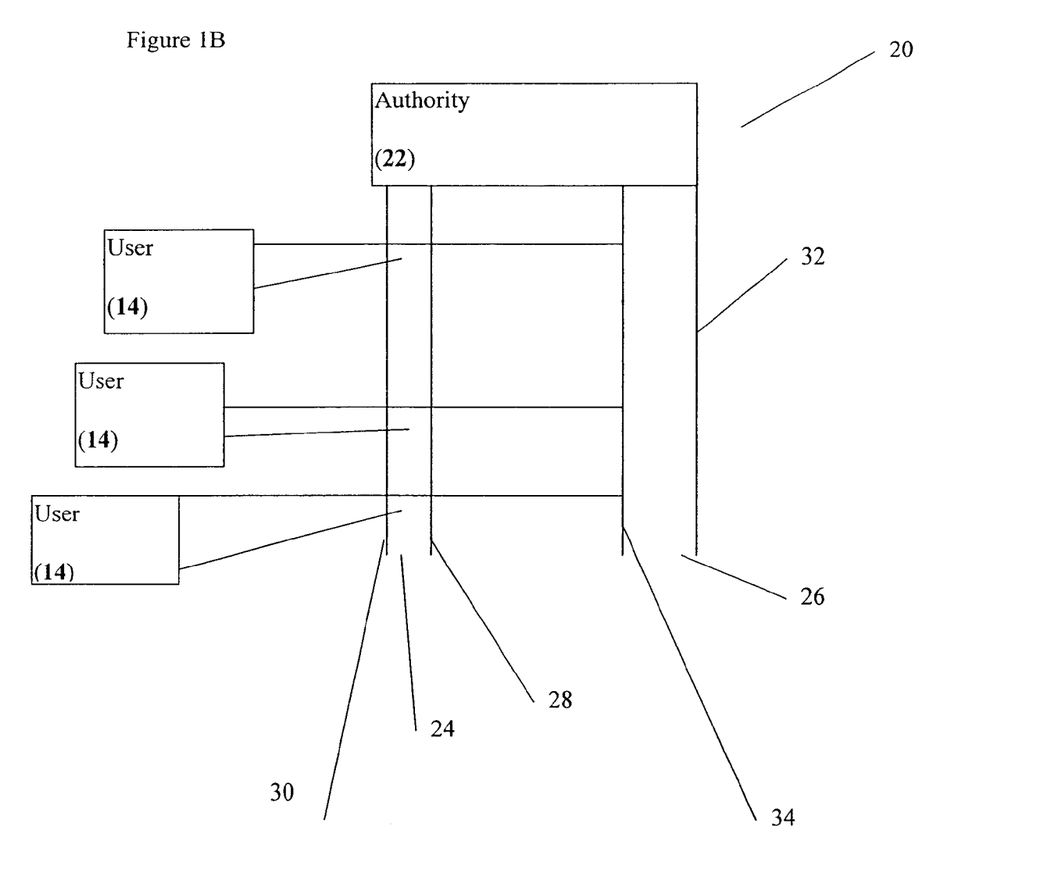

These examples include accessing a shared channel in LAN (local area networks), and requesting a Web page or other HTTP (HyperText Transfer Protocol) service from a Web (HTTP) server through the Internet. In addition, an example of a system for determining access for a wireless channel is shown in FIG. 1B below.

For implementation of the present invention in a LAN, for example, access authority 18 would be the network manager which monitors the channel. The network manager would announce the access probability to users 14 through the network according to the addressing protocol employed by the network. For example, if users 14 all listened to a specific broadcast or multicast address, such as for the Ethernet protocol for example, then access authority 18 would transmit the access probability to users 14 at that broadcast or multicast address. In this case, access broadcaster 16 is actually a particular address or set of addresses within the network which is used by access authority 18 to transmit the access probability to users 14, and transmit channel 12 is the address or set of addresses to which users 14 can send data. It should be noted that transmit channel 12 and access broadcaster 16 may be overlapping, depending upon the structure of the network.

In yet another example, requesting a Web page or other HTTP (HyperText Transfer Protocol) service from a Web (HTTP) server through the Internet, which is the network, transmit channel 12 and access broadcaster 16 are defined somewhat differently. In this case, access authority 18 is a Web server accessing a Web site through the Internet, which would determine an access probability for users 14, which are Web browsers. Access broadcaster 16 would be a particular URL or Web address which would be read by user 14 before accessing the Web server. Transmit channel 12 is an URL for obtaining the Web page.

Although the access probability and the data itself would both be served by the Web server, the relatively small size of the access probability compared to the size of the typical Web page (HTML or other mark-up language document) would still increase the efficiency of serving Web pages. Such an implementation would also enable users 14 to choose between equivalent access authorities 18, or mirror sites, for accessing the Web page, according to the load on the different mirror sites. A similar implementation could also be used for client-server systems, for example, in which a server serves data to one or more clients.

As shown in FIG. 1B, a system 20 is suitable for wireless applications, such as a satellite-based network or a cellular network. For example, for a satellite-based network, an access authority 22 is the satellite itself. This implementation would require an on-board processing capability for the satellite, to enable the access probability to be calculated.

Instead of transmit channel 12 and access broadcaster 16, system 20 features a signaling channel 24 and a data channel 26. Signaling channel 24 is further divided into an up-link signaling channel 28 and a down-link signaling channel 30. Signaling channel 24 is also known as a "reservation channel" for satellite-based networks, enabling users 14 to both transmit requests for bandwidth from access authority 22 and to receive instructions from access authority 22. The method of the present invention could be used as the MAC protocol for the reservation channel in such satellite-based networks.

Data channel 26 is also divided into an up-link data channel 32 and a down-link data channel 34. Data channel 26 is used for the transmission and reception of voice or other data. Access to up-link data channel 32 by users 14, for transmission of voice or other data, is preferably determined according to TDMA, CDMA, or another efficient collision-free allocation scheme. Access authority 22 itself schedules and controls transmissions through down-link data channel 34 to users 14.

However, for signaling channel 24, access is determined according to a different protocol. Users 14 must transmit requests on up-link signaling channel 28 to perform call set-up, in order to be able to transmit voice or other data on up-link data channel 32. Therefore, competition could potentially exist between users 14 for access to up-link signaling channel 28. According to the present invention, access to up-link signaling channel 28 is determined according to the access probability determined by access authority 22, preferably under a slotted ALOHA protocol.

Figure 3:
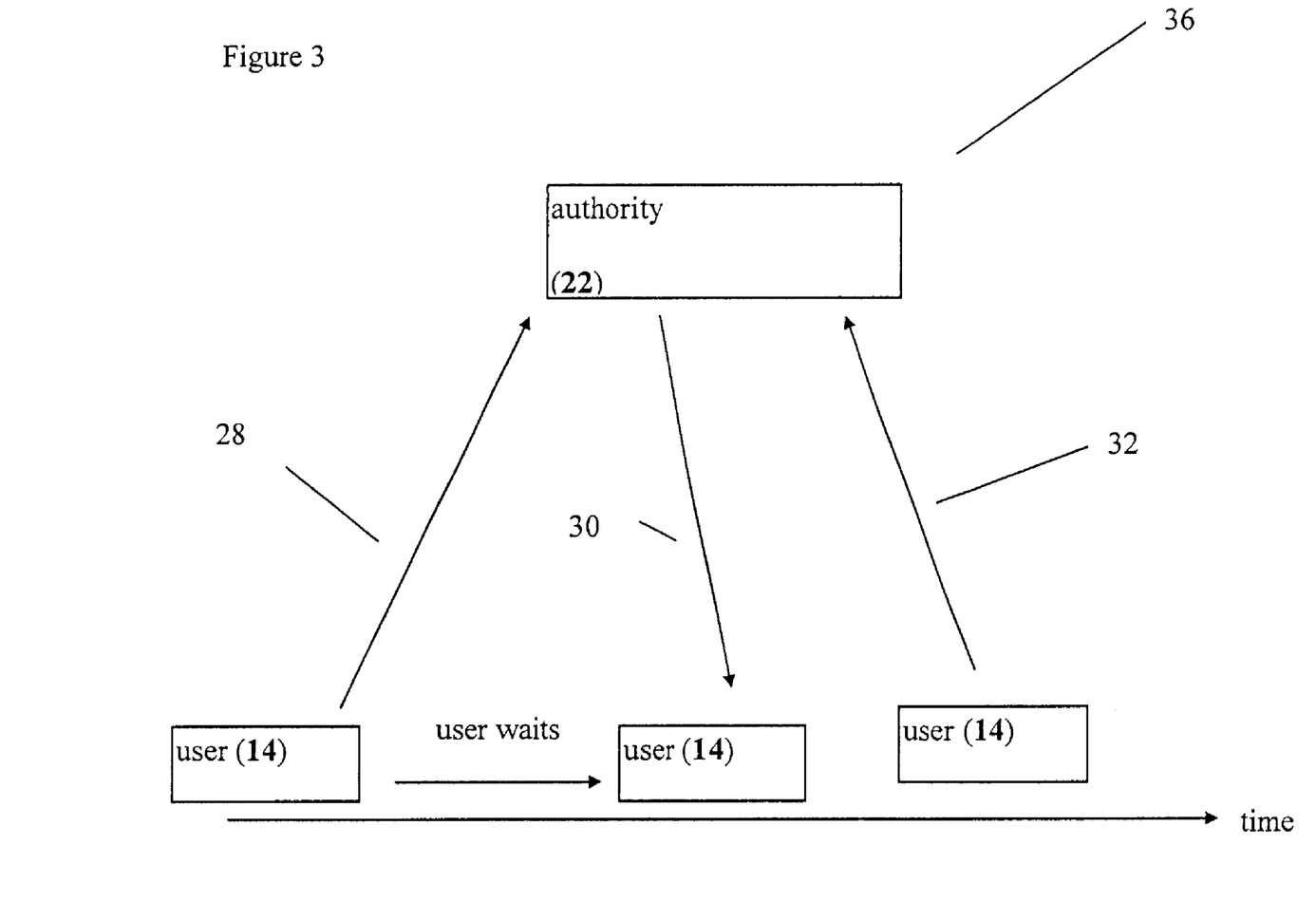
FIG. 3 is a schematic block diagram of an exemplary embodiment of a system according to the present invention for a satellite network.

For this implementation, the access broadcaster is down-link signaling channel 30, to which users 14 must listen in order to receive the access probability from access authority 22. In addition, users 14 may optionally receive CTS (Clear-to-Send) messages through down-link signaling channel 30. Users 14 also optionally and preferably receive instructions concerning data transmissions through up-link data channel 32 by listening to down-link signaling channel 30. Further description of the implementation of the present invention with regard to satellite networks is shown in FIG. 3 below.

For a cellular network, up-link signaling channel 28 is used for call handling and user registration, such that preferably access authority 22 broadcasts two different access probabilities. The first access probability would be for user registration, and the other access probability would be for call requests.

Access authority 22 for the cellular network is preferably the mobile switching center (MSC), which determines the access probability to each base station (BS). Alternatively, access authority 22 could be the base stations themselves, in which each base station determines the access probability within the cell controlled by that base station. In both cases, the access probability in each cell is announced by the local base station. The method of the present invention could be used as the MAC protocol for the up-link signaling channel in cellular networks.

The system and method of the present invention could also be used to track mobile users in wireless networks. This implementation would require announced access probability for user registration.

For either of the systems of FIGS. 1A or 1B, the channel access probability is not necessarily unique. Different access probabilities may be assigned to different users 14, or to different tasks performed by users 14. For example, for public satellite-based networks, different groups of stations may use different access probabilities, based on the Quality of Service (QOS) each station is entitled to receive. For a LAN, different tasks may get different priorities. For example, sending files through the network for printing may get lower access probability. As noted previously, in a cellular network, the up-link signaling channel may use two different access probabilities: one for call requests, and another one for registration of users. Thus, the access probability can be adjusted according to the requirements of the particular type of network.

Figure 2A:
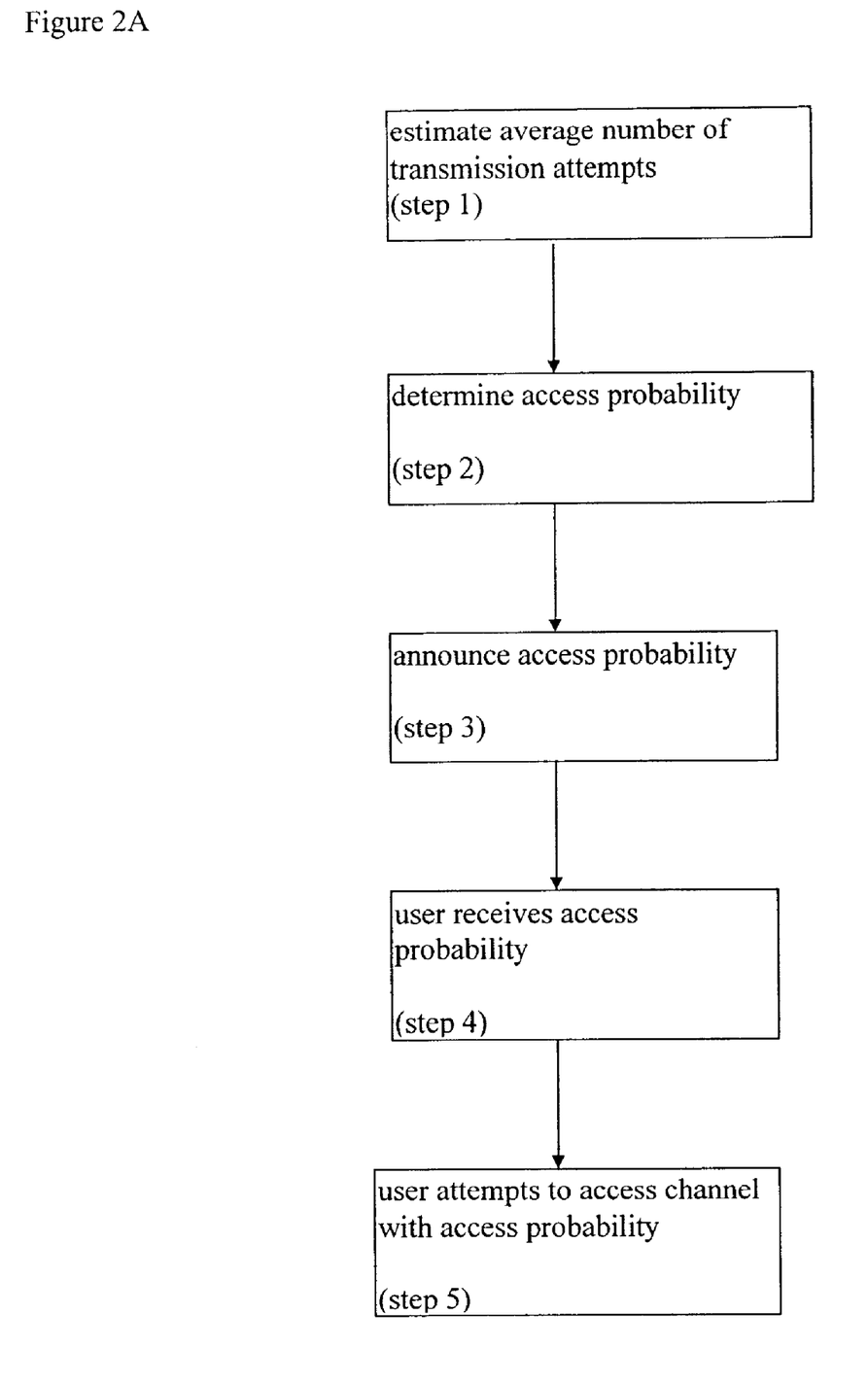
FIGS. 2A–2C are flowcharts of exemplary methods according to the present invention.
Figure 2B:
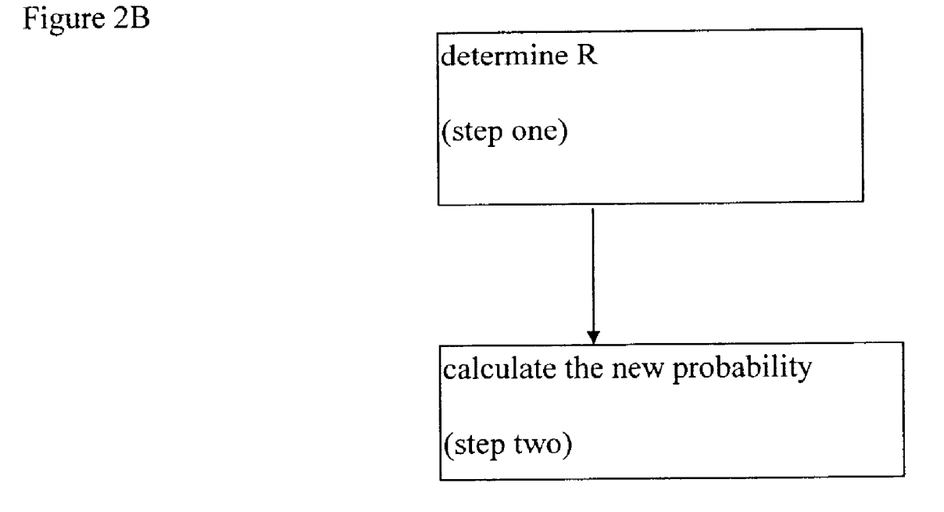

FIGS. 2A and 2B show flowcharts of an exemplary method according to the present invention for determining access to a network having a shared channel. The network consists of many independent user stations wishing to communicate with a central station. The network features a broadcast channel from the central station to which all of the user stations listen. Hence, a message transmitted through the broadcast channel is received by all of the user stations.

In this method, the network computes an access probability, which depends on the load, and announces the access probability as a broadcast message to the user stations. Each user station then attempts to access the shared channel with the announced probability.

The shared channel access method is as follows. In step one, the central station or network manager estimates the average number of transmission attempts per time unit, say R, by listening to the shared channel. In step two, the access probability p, based on the value of R, is determined. The access probability is announced to all user stations as a broadcast message in step three. In step four, each user station obtains the access probability, p. In step five, the user station attempts to access the shared channel with probability p. Steps one to five are preferably repeated as often as necessary.

As shown in FIG. 2B, the channel access probability is preferably calculated as follows. First, in step one, R, the average rate of transmission attempts per time unit, is determined by listening to the traffic on the channel. This traffic is being sent by users according to $p_{cur}$, the current access probability. In addition, $R_{opt}$, the optimal rate of transmission attempts, was previously determined to be the rate under which the channel efficiency is maximized according to the particular protocol being implemented, such as slotted ALOHA. Then, in step two, the new access probability, $p_{new}$ is given by Equation 1, in which:

$$P_{cur} \frac{R_{opt}}{R} \text{ if } R > R_{opt}$$

Alternatively, in Equation 1 $p_{new}$ is given by:

$$\min\left\{P_{cur} \frac{R_{opt}}{R}, 1\right\} \text{ if } R \leq R_{opt}$$

Hence, if $R > R_{opt}$ then $p_{new} < p_{cur}$. Alternatively, if $R \leq R_{opt}$ then $p_{new} \geq p_{cur}$. The conditions in Equation 1 guarantee that $0 < p_{new} \leq 1$. In step five, the user attempts to access the channel according to the access probability.

Figure 2C:
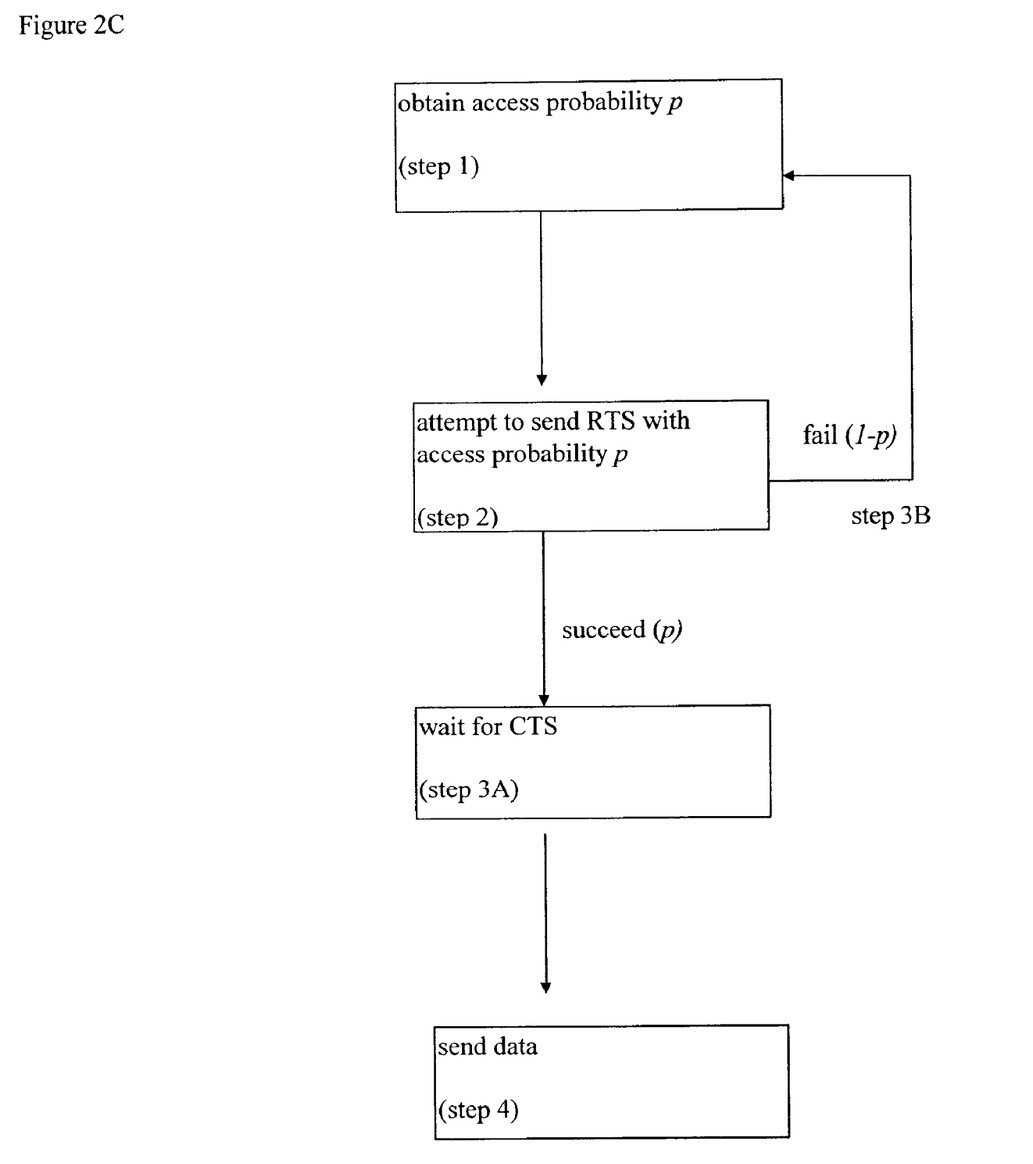

FIG. 2C shows an exemplary method for accessing a signaling channel, such as a control channel in a cellular network or a reservation channel in a satellite-based network, according to the present invention. A collision-free protocol such as TDMA or FDMA is preferably used to access the data channel.

As shown in FIG. 2C, in step 1, an access probability p is obtained. In step 2, the user attempts to send a Request-to-Send (RTS) message with probability p. In step 3a, if the RTS message was successfully sent (with probability p), the user waits for an acknowledgment, or CTS (Clear-to-Send) message. Otherwise, in step 3b, the method returns to step 2 (with probability 1-p).

Once the CTS message has been received, in step 4, the user sends data according to at least one instruction specified in the received CTS message.

FIG. 3 shows a schematic block diagram of a system 36 which would employ the method of FIG. 2C. As for FIG. 1B, there is access authority 22 which is a satellite and the access broadcaster is down-link signaling channel 30, to which user 14 must listen in order to receive the access probability from access authority 22. User 14 also receives CTS (Clear-to-Send) messages through down-link signaling channel 30. User 14 can preferably only send data through up-link data channel 32 after receiving such a CTS message.

In order to receive the CTS message, user 14 sends an RTS (Request-to-Send) message through up-link signaling channel 28 as shown. User 14 sends the RTS message according to the access probability received through down-link signaling channel 30. Assuming that user 14 successfully sends the RTS message through up-link signaling channel 28, user 14 must then wait for access authority 22 to send the CTS message through down-link signaling channel 30. Once the CTS message has been received, user 14 then sends data through up-link data channel 32.

EXAMPLE 1

Analysis of the Method of the Present Invention for Slotted ALOHA

The performance of the method of the present invention was analyzed under slotted ALOHA access. The slotted ALOHA protocol is widely used in real systems, especially in wireless networks. The analysis was conducted on a discrete time system, where the time is slotted. However, a similar analysis can be applied on a continuous time system. The performance analysis of the method of the present invention focused on two basic parameters: the channel utilization, which reflects the protocol efficiency, and the delay at low load periods. As shown below, the channel utilization was relatively high at high load, while the delay at periods of low load was minimal.

For the analysis of the method of the present invention, let r be the number of transmission attempts per time slot. The number of users may be considered to be infinite for channel access considerations. New transmission attempts are assumed to be generated according to a Poisson distribution. The rate of transmission attempts, both new and old (retransmission after collision), is also assumed to be a Poisson distribution, with mean R transmission attempts per time slot. In Equation 2, the probability of k transmission attempts per time slot is given therefore by the Poisson distribution:

$$Pr[k \text{ transmission attempts}] = \frac{R^k e^{-R}}{k!}$$

The channel efficiency is the probability of exactly one transmission attempt per time slot. This probability is given in Equation 3 by:

$$E = Re^{-R}$$

where R is the average rate of both new and old attempts to access the channel per time slot. Differentiating Equation 3 with respect to R, setting the result to zero, and solving for R, the maximal channel efficiency is found at R=1, with a throughput of 1/e. After substituting the value $R_{opt}=1$ in Equation 1, the new access probability, $p_{new}$, is given in Equation 4 by:

$$p_{new} = \text{Min } \{p_{cur}/R, 1\}$$

Hence, if R>1, then $p_{new}<p_{cur}$. Alternatively, if R≦1, then $p_{new} \geqq p_{cur}$.

Therefore, by determining the access probability according to Equation 4, the method of the present invention guarantees that the average R (average rate of transmission attempts per time unit) per time slot is at most 1. If Equation 3 is then substituted with the value R=1, the channel utilization under high load, U, is given by Equation 5:

$$U = e^{-1} \approx 37\%$$

The average number of transmission attempts per time slot R can be estimated according to Equation 2. First, the probability of an empty time slot is given by $e^{-R}$. Second, the probability of a successful transmission (exactly one transmission attempt during a single time slot) is given by $Re^{-R}$. The arithmetic average of both estimations yields a suitable approximation of R. The probability of a collision, Pr[collision], is given therefore by Equation 6:

$$Pr[\text{collision}] = 1 - e - Re^{-R}$$

Under optimal channel efficiency, the value of R is equal to 1, such that the collision probability is given by 1−(2/e) ≈26%.

Equations 4 and 6 imply that the access probability decreases with the load on the channel, when the load is managed according to the method of the present invention. For example, whenever the probability of collision is above 26%, the access probability decreases. Whenever this probability drops below 26%, the access probability increases and approaches the value of 1. A Hysteresis curve may optionally and preferably be used to stabilize the access probability. Hence, the method of the present invention guarantees, at high load periods, a channel efficiency of 1/e which is independent of the load.

To realize the dependency of the system performance on the parameter R (average rate of transmission attempts per time unit), it should be noted that from Equation 2, the probability of finding an empty slot is given by $e^{-R}$. Hence the probability that a successful transmission requires exactly k attempts (k−1 collisions followed by one success) is given by $e^{-R}(1-e^{-R})^{k-1}$. Hence, the expected number of attempts required for successful transmission, n, is given by equation 7:

$$n = \sum_{k=1}^{\infty} (ke^{-R}(1-e^{-R}))^{k-1} = e^R$$

Because of the exponential dependence of the expected number of attempts on the value of R, small increases in the channel load R can drastically reduce the channel efficiency of slotted ALOHA.

Let q be the access probability, such that 0<q≦1. The expected number of time slots required for one transmission is 1/q. Using Equation 7, the value of R=1 is substituted to determine the expected number of transmissions required for a successful transmission, which is $e^R=e$. Hence, the expected time delay, measured in the number of time slots, is given by:

$D = e/q$

Let r' be the number of users who wish to transmit, per time slot. Since the method of the present invention guarantees that for $r' \geq 1$, $R=R_{opt}=1$, $q=\min\{1/r, 1\}$. The expected time delay is therefore a monotonically decreasing function with q, and a monotonically increasing function with r'. The absolute minimum is achieved for q=1, which reflect at most one new transmission attempt per time slot.

EXAMPLE 2

Analysis of the Method of the Present Invention for Pure ALOHA

The implementation and analysis of the method of the present invention under the pure ALOHA protocol is very similar to the analysis under the slotted ALOHA protocol, as described in Example 1. The major difference is that the channel utilization, E, is given by Equation 9:

$$E = Re^{-2R}$$

The maximum channel efficiency occurs at R=0.5, with throughput of $0.5e \approx 18\%$. Similarly to the discrete time case, the value of the access probability, $p_{new}$, is given as a function of the load by Equation 10:

$$P_{new} = \min\left\{\frac{P_{cur}}{2R}, 1\right\}$$

The value of R can be estimated assuming that the probability of no transmission is $e^{-R}$, and that the probability of a successful transmission is $Re^{-2R}$.

It will be appreciated that the above descriptions are intended only to serve as examples, and that many other embodiments are possible within the spirit and the scope of the present invention.

What is claimed is:

1. A system for determining access of at least one of a plurality of users to a shared transmit channel, the shared transmit channel being shared by the plurality of users and the shared transmit channel being at least a portion of a network for connecting the plurality of users, the system comprising:
   (a) an access authority for determining an access probability for access by the at least one of the plurality of users according to a load on the shared transmit channel, said access probability being a probability of accessing the shared transmit channel; and
   (b) an access broadcaster for broadcasting said access probability to the at least one of the plurality of users, such that the at least one of the plurality of users accesses the shared transmit channel according to said access probability;
wherein said load is determined according to an average number of transmission attempts by the plurality of users.

2. The system of claim 1, wherein the network is a satellite network, said access authority is a satellite, said access broadcaster is a down-link signaling channel from said satellite and the shared transmit channel includes an up-link signaling channel for transmitting a request to transmit data to said satellite.

3. The system of claim 2, wherein the at least one user attempts to transmit a Request-to-Send (RTS) message according to said access probability on said up-link signaling channel.

4. The system of claim 1, wherein the network is a cellular network, the shared transmit channel includes an up-link signaling channel, said access authority is selected from the group consisting of a mobile switching center and a base station, and said access broadcaster is said base station.

5. The system of claim 4, wherein the at least one user attempts to transmit a Request-to-Send (RTS) message according to said access probability on said up-link signaling channel.

6. The system of claim 1, wherein the network is a LAN (local area network), the shared transmit channel is a bandwidth of said LAN, said access authority is a network manager and said access broadcaster is at least one address received by substantially the entirety of the plurality of users.

7. The system of claim 1, wherein the network is an Internet, said access authority is a Web server, the shared transmit channel is an URL for obtaining a Web page and said access broadcaster is an URL for obtaining said access probability.

8. The system of claim 1, wherein said access probability is at least partially determined according to a type of transmission being transmitted by the at least one of the plurality of users on the shared transmit channel.

9. The system of claim 1, wherein said access probability is at least partially determined according to the at least one of the plurality of users.

10. The system of claim 1, wherein said access probability is determined according to said load R, according to a previous access probability, $P_{cur}$, and according to an optimal rate of transmission attempts, $R_{opt}$.

11. The system of claim 10, wherein said access probability is determined according to an equation:

$$P_{cur} \frac{R_{opt}}{R} \text{ if } R > R_{opt}$$

alternatively, if $R \leq R_{opt}$, said equation is $$\min\left\{P_{cur} \frac{R_{opt}}{R}, 1\right\}.$$

12. A system for determining access of at least one of a plurality of users to an up-link signaling channel, the up-link signaling channel being shared by the plurality of users, the up-link signaling channel being at least a portion of a network for connecting the plurality of users, the system comprising:
   (a) an access authority for determining an access probability for access by the at least one of the plurality of users according to a load on the up-link signaling channel, said access probability being a probability of accessing the up-link signaling channel; and
   (b) a down-link signaling channel for broadcasting said access probability to the at least one of the plurality of users, such that the at least one of the plurality of users accesses the up-link signaling channel according to said access probability;
wherein said load is determined according to an average number of transmission attempts by the plurality of users.

13. The system of claim 12, wherein the network is a satellite network and said access authority is a satellite.

14. The system of claim 12, wherein the at least one user attempts to transmit a Request-to-Send (RTS) message according to said access probability on said up-link signaling channel.

15. The system of claim 14, further comprising an up-link data channel for sending data from the at least one user to said access authority, wherein said access authority sends the at least one user a CTS (Clear-to-Transmit) message upon receipt of said RTS message, such that the at least one user transmits on said up-link data channel substantially only upon receipt of said CTS message.

16. The system of claim 12, wherein the network is a cellular network, and said access authority is selected from the group consisting of a mobile switching center and a base station.

17. A method for determining access of at least one of a plurality of users to a shared transmit channel, the shared transmit channel being shared by the plurality of users and the shared transmit channel being at least a portion of a network for connecting the plurality of users, the steps of the method being performed by a data processor and the method comprising the steps of:

(a) estimating an average number of transmission attempts by the plurality of users on the shared transmit channel;

(b) determining an access probability according to said average number of transmission attempts;

(c) announcing said access probability to the at least one of the plurality of users;

(d) receiving said access probability by the at least one of the plurality of users; and (e) accessing the shared transmit channel by the at least one of the plurality of users according to said access probability.

18. The method of claim 17, wherein the step of accessing the shared transmit channel is also performed according to a slotted ALOHA protocol.

19. The method of claim 18, wherein R is said average rate of transmission attempts being transmitted according to a current access probability $p_{cur}$, and wherein the step of determining said access probability further comprises the steps of:

(i) determining $R_{opt}$, an optimal rate of transmission attempts, according to a protocol for accessing the shared transmission channel; and (ii) calculating a new access probability, $p_{new}$ according to an equation:

$$P_{cur}\frac{R_{opt}}{R} \text{ if } R > R_{opt}$$

and alternatively, if $R \leq R_{opt}$:

$$\min\left\{P_{cur}\frac{R_{opt}}{R}, 1\right\}.$$

20. The method of claim 19, wherein said optimal rate of transmission attempts is determined according to said slotted ALOHA protocol.

* * * * *